(12) United States Patent
Suzuki et al.

(10) Patent No.: US 8,781,235 B2
(45) Date of Patent: Jul. 15, 2014

(54) OBJECT RECOGNITION APPARATUS, RECOGNITION METHOD THEREOF, AND NON-TRANSITORY COMPUTER-READABLE STORAGE MEDIUM

(75) Inventors: Takashi Suzuki, Kawasaki (JP); Shunsuke Nakano, Kawasaki (JP); Hiroshi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 13/208,072

(22) Filed: Aug. 11, 2011

(65) Prior Publication Data

US 2012/0051646 A1 Mar. 1, 2012

(30) Foreign Application Priority Data

Aug. 25, 2010 (JP) ................. 2010-188752

(51) Int. Cl.
*G06K 9/68* (2006.01)
*G06K 9/62* (2006.01)

(52) U.S. Cl.
USPC .......................................... 382/218; 382/224

(58) Field of Classification Search
USPC ................ 382/190, 209, 218, 224, 225, 305; 707/705, 708, 710, 713, 714, 740
See application file for complete search history.

(56) References Cited

U.S. PATENT DOCUMENTS

| | | | |
|---|---|---|---|
| 5,760,346 A | 6/1998 | Kobayashi et al. | |
| 5,761,087 A | 6/1998 | Yoshimura et al. | |
| 5,862,049 A | 1/1999 | Sato et al. | |
| 6,225,986 B1 | 5/2001 | Sato et al. | |
| 6,239,792 B1 | 5/2001 | Yanagisawa et al. | |
| 6,285,995 B1 | 9/2001 | Abdel-Mottaleb | |
| 6,288,711 B1 | 9/2001 | Tanaka et al. | |
| 6,611,258 B1 | 8/2003 | Tanaka et al. | |
| 7,124,148 B2 * | 10/2006 | Sauermann | ................... 707/740 |
| 7,734,072 B2 | 6/2010 | Yamaguchi | |
| 7,881,524 B2 | 2/2011 | Matsugu et al. | |
| 7,912,253 B2 | 3/2011 | Suzuki et al. | |
| 7,995,805 B2 | 8/2011 | Suzuki et al. | |

(Continued)

FOREIGN PATENT DOCUMENTS

| | | |
|---|---|---|
| JP | 2001-333365 A | 11/2001 |
| JP | 2002-519748 A | 7/2002 |
| JP | 2006-243849 A | 9/2006 |
| JP | 2008-250829 A | 10/2008 |

OTHER PUBLICATIONS

Japanese Office Action issued on May 30, 2014, corresponding to Japanese Patent Application No. 2010-188752.

*Primary Examiner* — Daniel Mariam
(74) *Attorney, Agent, or Firm* — Fitzpatrick, Cella, Harper & Scinto

(57) ABSTRACT

An apparatus extracts a first dictionary information associated with a first category from among multiple categories included in a dictionary and second dictionary information associated with a second category from among multiple categories included in the dictionary or another dictionary, calculates a first feature amount and a second feature amount from the first dictionary information and the second dictionary information, respectively, receives an instruction as to whether or not to integrate a name of the first category and a name of the second category in the case where it is determined that a similarity between the calculated first feature amount and second feature amount is greater than a predetermined threshold and that the name of the first category and the name of the second category do not match, and integrates the name of the first category and the name of the second category with the received post-integration name.

7 Claims, 16 Drawing Sheets

(56) References Cited

U.S. PATENT DOCUMENTS

| | | | |
|---|---|---|---|
| 8,311,556 B2* | 11/2012 | Wang et al. | 455/456.1 |
| 8,352,496 B2* | 1/2013 | Johnston | 707/780 |
| 8,358,811 B2 | 1/2013 | Adams et al. | |

| | | |
|---|---|---|
| 2006/0115157 A1 | 6/2006 | Mori et al. |
| 2009/0089235 A1 | 4/2009 | Torii et al. |
| 2009/0324060 A1 | 12/2009 | Sato et al. |
| 2011/0158540 A1 | 6/2011 | Suzuki et al. |
| 2011/0179052 A1 | 7/2011 | Sato |

\* cited by examiner

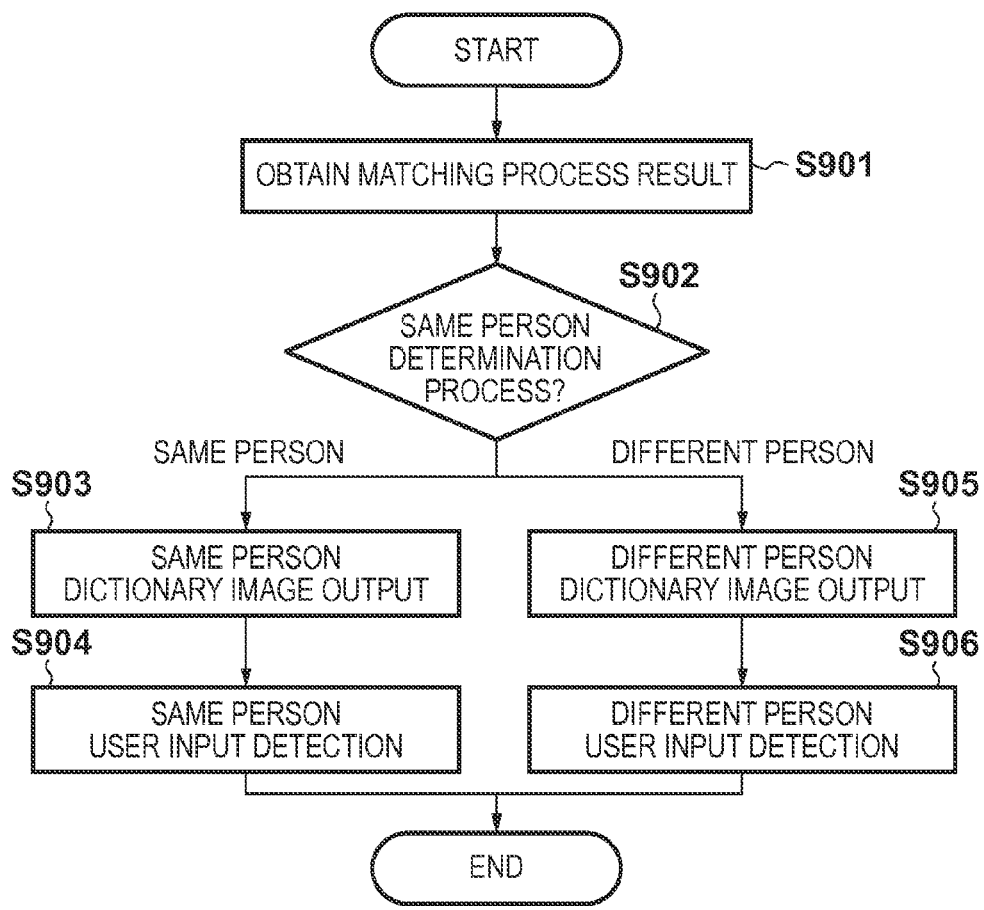

OUTPUT MESSAGE EXAMPLE — 1001

OUTPUT MESSAGE EXAMPLE — 1101

OUTPUT MESSAGE EXAMPLE 1301

OUTPUT MESSAGE EXAMPLE DETAILS 1402

OBJECT RECOGNITION APPARATUS, RECOGNITION METHOD THEREOF, AND NON-TRANSITORY COMPUTER-READABLE STORAGE MEDIUM

BACKGROUND OF THE INVENTION

1. Field of the Invention

The present invention relates to object recognition apparatuses that integrate dictionary data through object recognition, and relates to recognition methods thereof for non-transitory computer-readable storage media.

2. Description of the Related Art

Facial recognition techniques are known as a representative example of an object recognition technique. A facial recognition technique searches for the location of a predetermined person within an image. A function in which a digital camera focuses on a predetermined person can be realized by incorporating such a facial recognition technique into the digital camera.

A facial recognition process provided in a digital camera is executed using a matching process that compares a feature amount of a pre-registered person with feature amounts of multiple subject people. Feature amounts of people are registered by capturing an image of a person that is to be registered using the digital camera and storing the captured image in a memory as dictionary data. Furthermore, in the case where there are multiple people to be recognized, it is necessary to obtain captured data for each of those people and store each piece of the captured data in the memory. The dictionary data that is stored may be image data, or may be feature amount data that cannot be visualized.

Recently, it is common for people to own their own digital cameras, and furthermore, it is thought that in the future, it will become common for people to own multiple digital cameras. As described earlier, the dictionary data of a digital camera is unique to that camera. It is thought that in the future, it will not only be necessary to reduce image capturing operations for obtaining dictionary data as much as possible, but it will also be necessary to provide a function for integrating and sharing dictionary data used in the facial recognition processes among multiple digital cameras (a best dictionary data sharing function).

However, there are several problems that must be solved in order to share dictionary data among cameras. One such problem exists between the dictionary data of the multiple digital cameras that is to be integrated, and the dictionary data that is unique to a certain imaging device. That is, in the case where dictionary images of the same person are present in multiple pieces of dictionary data, the case where identical category names have been given to different people, and so on, how to integrate and share the respective pieces of dictionary data is a problem.

Japanese Patent Laid-Open No. 2001-333365 discloses a technique for wirelessly transferring images captured by a master camera to slave cameras that belong to a group based on group setting information. Here, the group setting information is recorded in a memory card such as a Compact Flash® card. Meanwhile, Japanese Patent Laid-Open No. 2008-250829 discloses a technique related to a pedestrian verification apparatus, where in the case where a person for which a verification result of "NG" has been obtained is present, a facial image of that person is presented along with multiple higher-ranked candidate images based on the verification result, whereupon a manager determines whether or not to add the facial image to a registry as a dictionary image.

Accordingly, conventional techniques discuss the integration of captured images and the addition and presentation of dictionary images.

However, a method for creating integrated dictionary data when integrating dictionary data among multiple imaging devices has not yet been provided. Accordingly, it is necessary to solve a problem that occurs when integrating dictionary data among multiple imaging devices, or in other words, a problem in which there is conflict among category names, in techniques related to the integration of dictionary data for users who own multiple digital cameras that will become necessary in the future.

SUMMARY OF THE INVENTION

The present invention provides a technique for appropriately associating category names in dictionary data that is to be integrated even if images of the same person are present in different category names within the dictionary data that is to be integrated.

According to a first aspect of the present invention there is provided an object recognition apparatus comprising: an extraction unit configured to extract first dictionary information associated with a first category from among multiple categories included in a dictionary for object recognition and second dictionary information associated with a second category from among multiple categories included in the dictionary or another dictionary; a determination unit configured to calculate a first feature amount and a second feature amount from the first dictionary information and the second dictionary information, respectively, and determine whether or not a similarity between the calculated first feature amount and second feature amount is greater than a predetermined threshold; a comparison unit configured to compare a name of the first category with a name of the second category; a reception unit configured to receive an instruction as to whether or not to integrate the name of the first category and the name of the second category in the case where the determination unit has determined that the similarity is greater than the predetermined threshold and the comparison unit has determined that the name of the first category and the name of the second category do not match; and an integration unit configured, in the case where the reception unit has received an instruction to integrate the names of the categories and a post-integration name, to integrate the name of the first category and the name of the second category with the received post-integration name.

According to a second aspect of the present invention there is provided an object recognition method for an object recognition apparatus, the method comprising: extracting first dictionary information associated with a first category from among multiple categories included in a dictionary for object recognition and second dictionary information associated with a second category from among multiple categories included in the dictionary or another dictionary; calculating a first feature amount and a second feature amount from the first dictionary information and the second dictionary information, respectively, and determining whether or not a similarity between the calculated first feature amount and second feature amount is greater than a predetermined threshold; comparing a name of the first category with a name of the second category; receiving an instruction as to whether or not to integrate the name of the first category and the name of the second category in the case where it has been determined that the similarity is greater than the predetermined threshold and that the name of the first category and the name of the second category do not match; and integrating, in the case where an instruction to integrate the names of the categories and a post-integration name have been received, the name of the first category and the name of the second category with the received post-integration name.

According to a third aspect of the present invention there is provided a non-transitory computer-readable storage medium in which is stored a program for causing a computer to function as: an extraction unit configured to extract first dictionary information associated with a first category from among multiple categories included in a dictionary for object recognition and second dictionary information associated with a second category from among multiple categories included in the dictionary or another dictionary; a determination unit configured to calculate a first feature amount and a second feature amount from the first dictionary information and the second dictionary information, respectively, and determine whether or not a similarity between the calculated first feature amount and second feature amount is greater than a predetermined threshold; a comparison unit configured to compare a name of the first category with a name of the second category; a reception unit configured to receive an instruction as to whether or not to integrate the name of the first category and the name of the second category in the case where the determination unit has determined that the similarity is greater than the predetermined threshold and the comparison unit has determined that the name of the first category and the name of the second category do not match; and an integration unit configured, in the case where the reception unit has received an instruction to integrate the names of the categories and a post-integration name, to integrate the name of the first category and the name of the second category with the received post-integration name.

Further features of the present invention will be apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 is a diagram illustrating a table that associates categories with image names.

FIG. 7 is a flowchart illustrating an interactive process.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
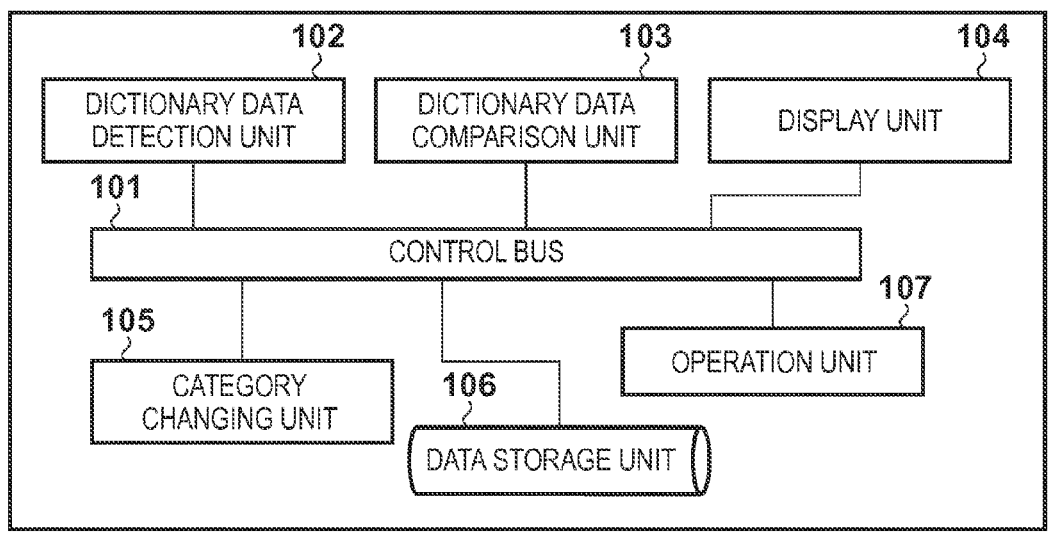
FIG. 1 is a block diagram illustrating the configuration of an object recognition apparatus.

FIG. 1 is a block diagram illustrating the configuration of an object recognition apparatus that is capable of changing categories through object recognition according to a first embodiment. The object recognition apparatus shown in FIG. 1 includes a control bus 101, a dictionary data detection unit 102, a dictionary data comparison unit 103, a display unit 104, a category changing unit 105, a data storage unit 106, and an operation unit 107.

The control bus 101 controls the input to or the output from the various functional blocks. Next, the dictionary data detection unit 102 determines whether or not dictionary data, which is dictionary information, has been input to the object recognition apparatus. Any method may be used as the method for carrying out this determination. For example, assuming a configuration in which a portable storage device such as a Compact Flash memory is connected to the apparatus, the dictionary data is detected by scanning the memory.

The dictionary data comparison unit 103 compares dictionary data read from an external storage device connected to the object recognition apparatus with dictionary data that is already present in the object recognition apparatus and that is similar to the read dictionary data, that is, similar information. Next, the display unit 104 presents information that is necessary to a user. The category changing unit 105 changes the names of desired categories related to the dictionary data stored in the data storage unit 106 in accordance with a category changing method, which will be described later.

The data storage unit 106 holds dictionary data that has been created in advance by another unit and that is unique to the object recognition apparatus. Next, the operation unit 107 is a user interface through which the user confirms information displayed in the aforementioned display unit 104 and carries out operations for responding to that information. Note that the dictionary data detection unit 102, the dictionary data comparison unit 103, the display unit 104, the category changing unit 105, and the operation unit 107 are realized as processing circuits or firmware.

Figure 2:
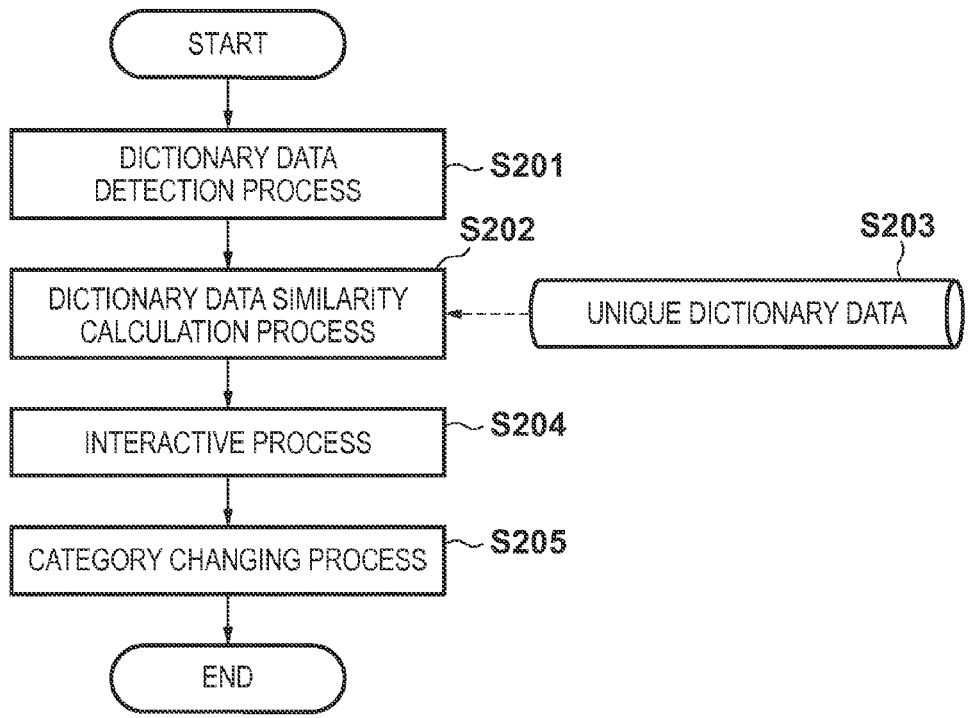
FIG. 2 is a processing flowchart illustrating a dictionary data integration method.

Next, a dictionary data integration method will be described. FIG. 2 is a flowchart illustrating a dictionary data integration method. The present embodiment describes a facial recognition method that classifies individuals based on facial images as an example. However, it should be noted that this method is not limited to facial recognition, and it goes without saying that the present invention can be applied in various types of recognition aside from facial recognition. Furthermore, the dictionary data is not limited to data regarding faces, and may instead be, for example, audio data.

First, in step S201, the dictionary data detection unit 102 detects the presence of dictionary data that is different from dictionary data unique to a device that already holds dictionary data, such as, for example, a digital camera. Although details of unique dictionary data 203 will be given later, the dictionary data 203 refers to dictionary data that is already held.

Figure 3:
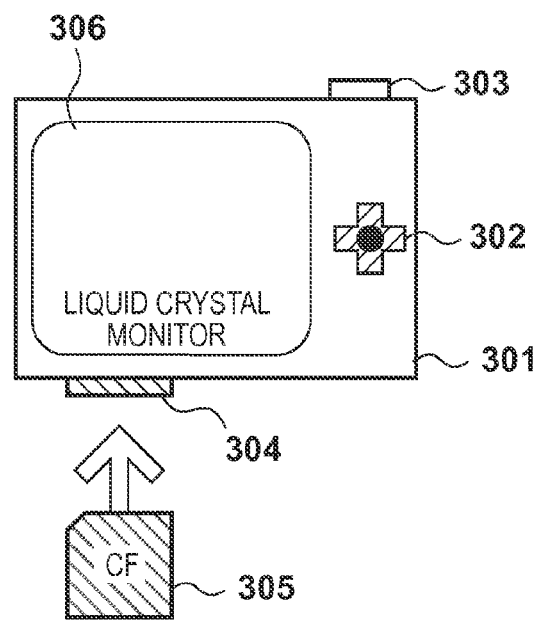
FIG. 3 is a diagram illustrating the configuration of various elements in a digital camera or a digital video camera.

In step S201, the dictionary data detection unit 102 detects dictionary data aside from the aforementioned unique dictionary data that is provided in a device. "Device" as mentioned here refers to the digital camera shown in FIG. 3, or a digital video camera. For example, in the case where the device is a digital camera 301, the dictionary data detected here is stored in a Compact Flash memory 305 or the like. In other words, the dictionary data that is unique to the device is recorded in an internal memory or the like. Accordingly, normal image data and image data used as the dictionary data can be distinguished from each other based on the data formats thereof in the Compact Flash memory 305.

The dictionary data stored in the Compact Flash memory 305 is created by copying the dictionary data that is present in the digital camera or the like. Note that the method for moving the dictionary data to another device is not limited to the use of a Compact Flash memory, and the dictionary data may be moved via an infrared communication unit, over the Internet, or the like.

Figure 4:
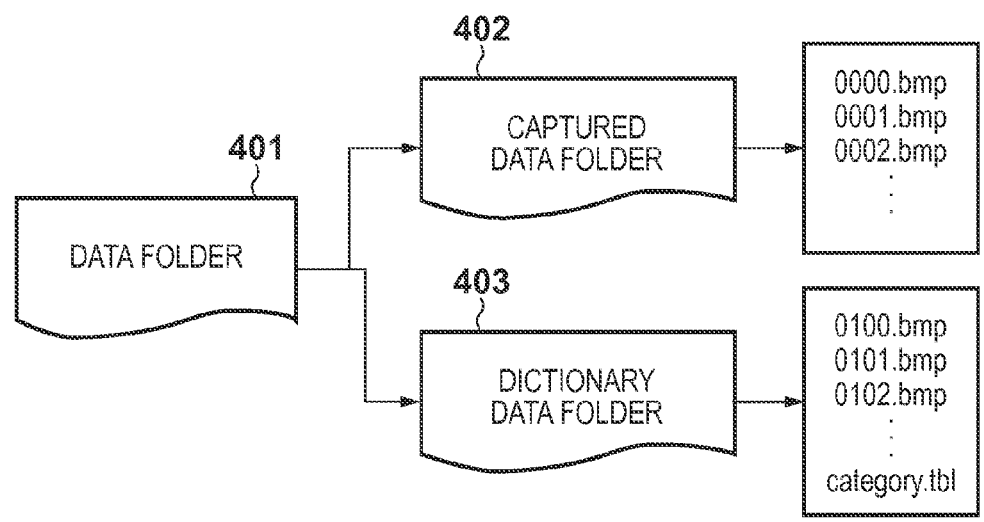
FIG. 4 is a diagram illustrating the structure of data in a Compact Flash memory.

FIG. 4 illustrates the data structure within the Compact Flash memory 305. Note that the data structure illustrated here is merely one example. The data format has two layers, with a captured data folder 402 and a dictionary data folder 403 located within a DATA folder 401.

Normal captured images are collected in the captured data folder 402, and these images include multiple subjects, or in other words, multiple people. On the other hand, the dictionary data that is to be added to the aforementioned digital camera 301 is saved in the dictionary data folder 403. The images in the dictionary data folder 403 are facial images of a single subject.

Figure 5:
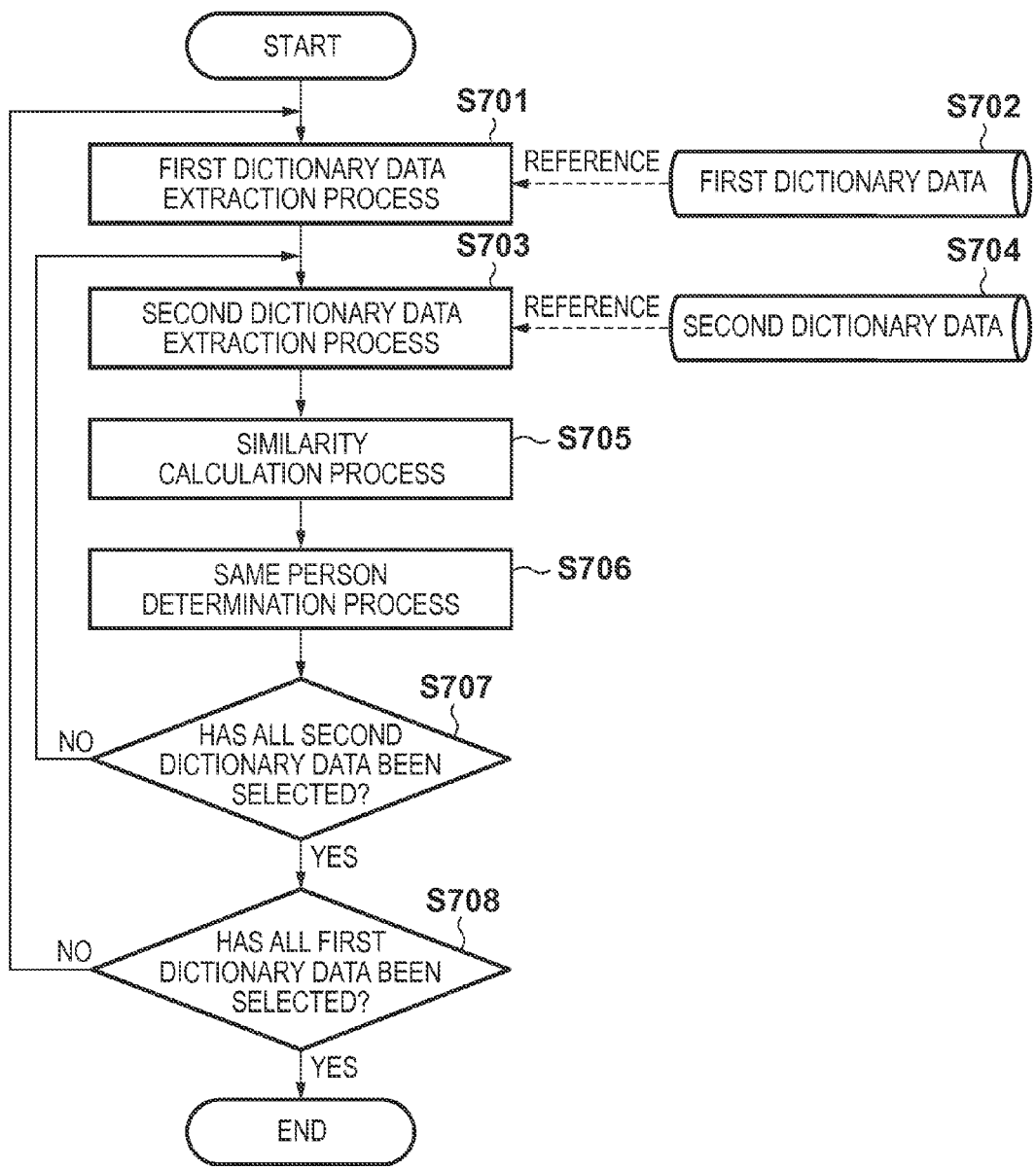
FIG. 5 is a diagram illustrating a process for calculating a similarity between dictionary data.

Although the dictionary data is described as images here, feature amounts that have undergone a predetermined filtering process may be employed as the dictionary data rather than images. Meanwhile, category names for the images or the feature amounts are denoted in the dictionary data folder 403, in a category.tbl file format. In the case where there is no dictionary data folder in step S201, the dictionary data detection unit 102 determines that no data is present. In this step, when the dictionary data has been detected, a message reading "there is dictionary data in the Compact Flash card. Would you like to import the data? Yes/No" is displayed in a liquid crystal monitor 306 shown in FIG. 3. Next, in step S202, the dictionary data comparison unit 103 carries out verification by calculating the similarity between the dictionary data detected in step S201 (first information) and the dictionary data present in the digital camera (second information). Details regarding the process for calculating the dictionary data similarity will be given hereinafter using the processing flowchart shown in FIG. 5. FIG. 5 illustrates the flow of the process for calculating the dictionary data similarity.

In step S701, the dictionary data comparison unit 103 extracts a single dictionary image present in first dictionary data 702, which corresponds to first dictionary information of a first dictionary. The first dictionary data is dictionary data present within the Compact Flash memory mentioned in step S201 in the aforementioned FIG. 2. Accordingly, the first dictionary data refers to image data that is within the dictionary data folder 403 shown in FIG. 4.

The first dictionary data includes a category table (the aforementioned category.tbl file) that has category information for each piece of image data. FIG. 6 illustrates an example of the category table. A category table 801 expresses information as to who the subject of each dictionary image is. As shown in FIG. 6, the subject of an image 0100.bmp is "father". Note that in the case where the dictionary data is predetermined feature amounts rather than images, the category table associates the feature amounts with category names.

Next, in step S703, the dictionary data comparison unit 103 extracts a single dictionary image present in second dictionary data 704, which corresponds to second dictionary information of a second dictionary. The second dictionary data is the aforementioned dictionary data that is held by and is unique to the digital camera. The second dictionary data also includes a category table, equivalent to that shown in FIG. 6, that has category information of dictionary images, as with the first dictionary data 702.

In step S703, the dictionary data comparison unit 103 extracts a single dictionary image belonging to a predetermined category from the second dictionary data.

In step S705, the dictionary data comparison unit 103 examines the similarity between the dictionary images extracted in step S701 and step S703, respectively. A common technique may be employed for the examination of the similarity. A case in which a correlation value is computed using luminance vectors of the facial regions of images of people as the feature amounts will be described here as an example.

It is assumed that the luminance vector of the dictionary image extracted in step S701 (a first feature amount) is expressed as $I_{11}$, and the luminance vector of the dictionary image extracted in step S703 (a second feature amount) is expressed as $I_{21}$. Here, the respective luminance vectors $I_1$ (a first luminance vector) and $I_2$ (a second luminance vector) have had their sizes normalized based on the positions of the eyes. Note that the positions of the eyes may be determined using a common processing method such as template matching or the like. Furthermore, the method for finding the similarity between the dictionary images is not limited to the method described here. For example, the similarity can be found based on projected distances of dictionary sub-spaces found from the luminance vectors within local regions that include part of the faces. In such a case, the dictionary data is a vector group expressing the sub-space, rather than an image.

The formula for finding the similarity (correlation value) at this time is as follows.

$$S = \frac{(I_{11} \cdot I_{21})}{|I_{11}||I_{21}|} \dots \quad (1)$$

Here, Formula (1) expresses a normalized correlation value.

Next, in step S706, the dictionary data comparison unit 103 determines whether or not the images extracted in step S701 and step S703, respectively, are images of the same person, based on the correlation value calculated in the previous step.

The determination as to whether the people are the same person is carried out through a process that employs a threshold against the normalized correlation value expressed by Formula (1). In other words, in the case where the normalized correlation value is greater than a predetermined threshold, it is highly likely that the dictionary image data extracted in step S701 and step S703, respectively, represent the same person. On the other hand, in the case where the normalized correlation value is less than or equal to the predetermined threshold, it is highly likely that the dictionary image data extracted in step S701 and step S703, respectively, do not represent the same person.

Here, the result of the matching carried out between the two images is saved in a database (not shown). Note that the predetermined threshold is a parameter that is set by the user or a designer.

Next, in step S707, the dictionary data comparison unit 103 determines whether or not all of the images in the second dictionary data have been selected, and in step S708, determines whether or not all of the images in the first dictionary data have been selected. Ultimately, when it has been determined in step S708 that all of the data has been selected, the flow illustrated in FIG. 5 ends.

The descriptions will now return once again to FIG. 2. Operations carried out in the interactive process of step S204 will now be described. In step S204, the display unit 104 displays the message shown in FIG. 3 in the liquid crystal monitor 306 of the digital camera 301, in accordance with the state of the matching carried out between the dictionary data in the previous step S202. In addition, the operation unit 107 detects inputs from the user and carries out processing. Specific descriptions will now be given using the flowchart illustrated in FIG. 7.

FIG. 7 is a flowchart illustrating operations of the interactive process carried out in step S204. In step S901, the dictionary data comparison unit 103 obtains a single matching result by referring to a table in which the results of the matching carried out between the dictionary data, mentioned in FIG. 2, are written, in order to obtain a matching process result. In step S902, the dictionary data comparison unit 103 determines whether or not two pieces of dictionary data represent the same person by referring to the table in which the matching results between the dictionary data are written, and examining the similarity between two pieces of dictionary data associated with given categories. A process that employs the aforementioned predetermined threshold is used as the method for this determination. Here, in the case where it has been determined that the two pieces of dictionary data represent the same person, the procedure advances to step S903.

Figure 8A:
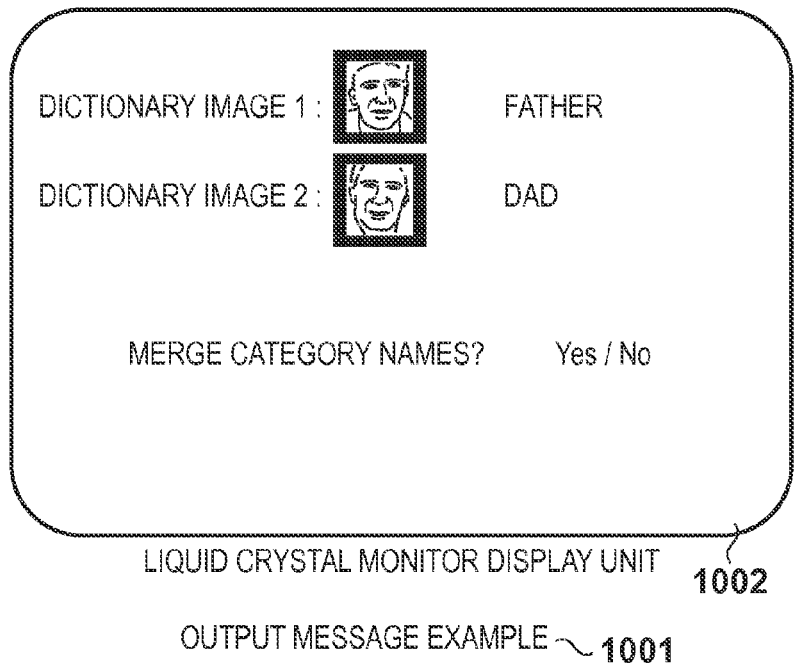
FIGS. 8A and 8B are diagrams illustrating outputs on liquid crystal monitors used for user confirmation.
Figure 8B:
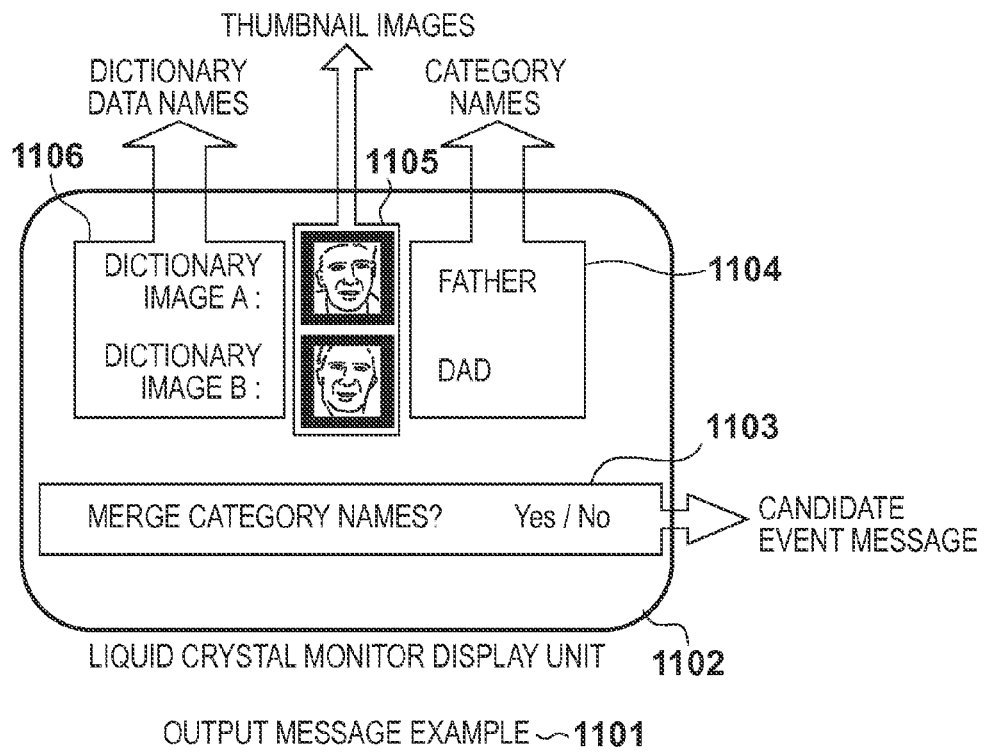

In step S903, the dictionary data comparison unit 103 outputs a person dictionary data determination result, and the display unit 104 outputs a message to the liquid crystal monitor 306 based on the result of determining whether or not the two pieces of dictionary data represent the same person. FIG. 8A illustrates an example of the output message that is displayed. The message is, for example, output to a display unit, or the liquid crystal monitor 306 shown in FIG. 3, in the format illustrated in FIG. 8A. This message is output in the case where the two category names do not match, and is output along with the two dictionary images that are thought to represent the same person. FIG. 8B indicates details of the various elements of the message shown in FIG. 8A. An output message example 1101 includes a candidate event message 1103, category names 1104, thumbnail dictionary images 1105, and dictionary data names 1106. The candidate event message 1103 is a display that reads "Marge category names? Yes/No", and indicates an operation to which the user should respond. The category names 1104 indicates the names of the categories to which the respective thumbnail dictionary images 1105 belong. Here, a dictionary image A belongs to a category "father" (a first category), whereas a dictionary image B belongs to a category "dad" (a second category). The dictionary data names 1106 displays what sort of dictionary data the respective thumbnail dictionary images represent.

Figure 9:
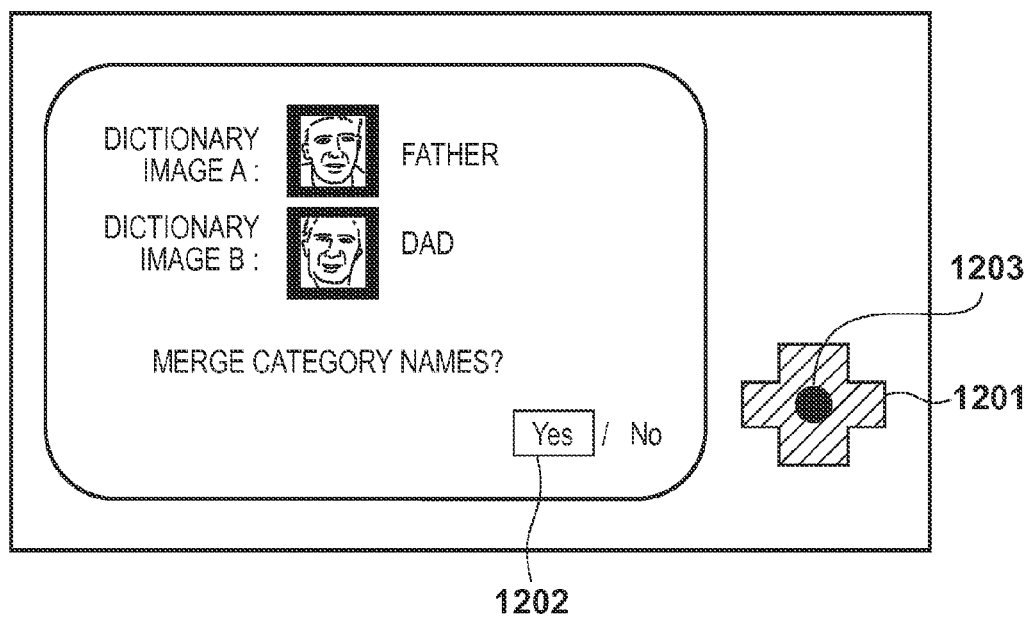
FIG. 9 is a diagram illustrating an output on a liquid crystal monitor used for user confirmation.

Here, the descriptions will return to the flowchart illustrated in FIG. 7. In step S904, the operation unit 107 receives and detects an input from the user regarding the discovery of images of the same person, with respect to dictionary data of the same person. This user input is carried out, for example, using a cursor key. FIG. 9 illustrates an example of a cursor key for detecting an input. The user selects either "Yes" or "No" as displayed in the message, using a cursor key 1201. FIG. 9 illustrates a case in which the user has moved a cursor 1202 to the area indicating "Yes", and thus the user has selected "Yes" through his or her input. Note that the unit for detecting the input is not limited to a cursor key, and maybe a unit aside from the cursor key. For example, an input method that employs a touch panel system may be used as well.

Figure 10A:
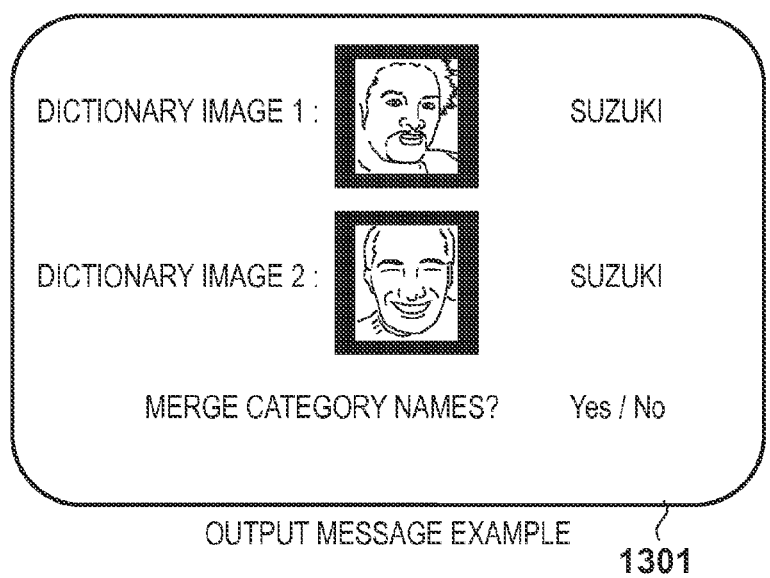
FIGS. 10A and 10B are diagrams illustrating outputs on liquid crystal monitors used for user confirmation.

In the case where it has been determined in step S902 that the people are not the same person, step S905, in which the next dictionary data of a person that is not the same is output, is executed. In step S905, two dictionary images and category names in which the categories have been compared are output to the liquid crystal monitor 306. FIG. 10A illustrates an example of the format of the display output in step S905. An output message example 1301 that is output as shown in FIG. 10A illustrates the output of two dictionary images that are not of the same person but belong to the same category.

Figure 10B:
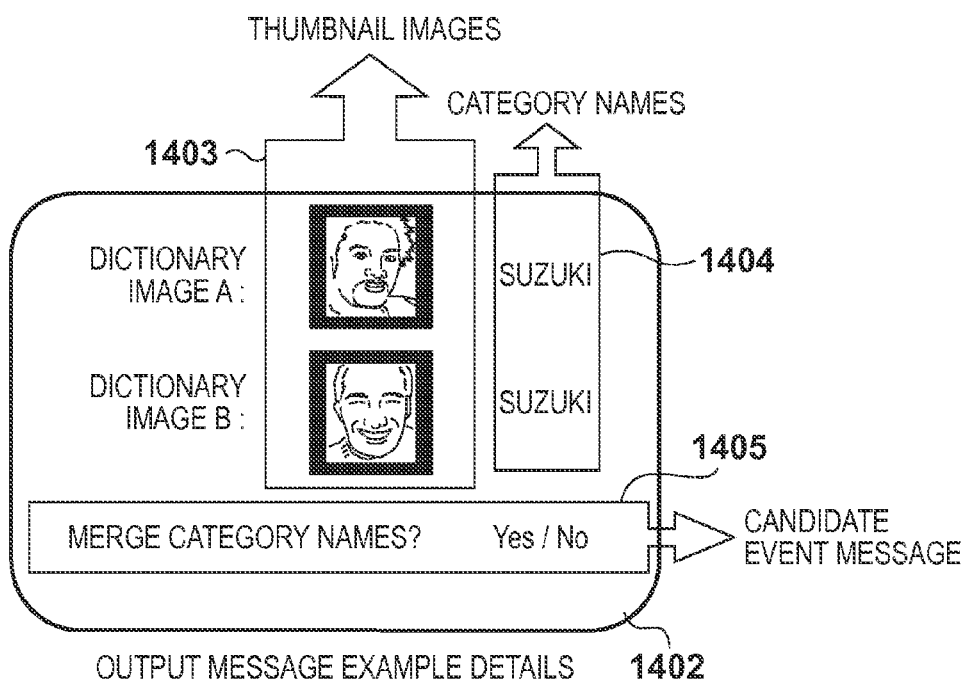

Next, step S906, in which a user input regarding people that are not the same is detected, will be described. In step S906, the display unit 104 outputs the message illustrated in FIG. 10B, and the operation unit 107 detects an input from the user. The message that is output will be described using FIG. 10B.

In step S906, a user input with respect to people that are not the same is detected, and the result thereof is processed. Meanwhile, dictionary images 1403 are images that have been determined to belong to the same category but that are not of the same person. Category names 1404 indicate the categories of corresponding people of the dictionary images 1403. Furthermore, a candidate event message 1405 indicates an event of which the user is to be notified. The user inputs a response to the candidate event message 1405 by operating the aforementioned cursor key. The method for making the input is the same as the method described in step S904.

Figure 11:
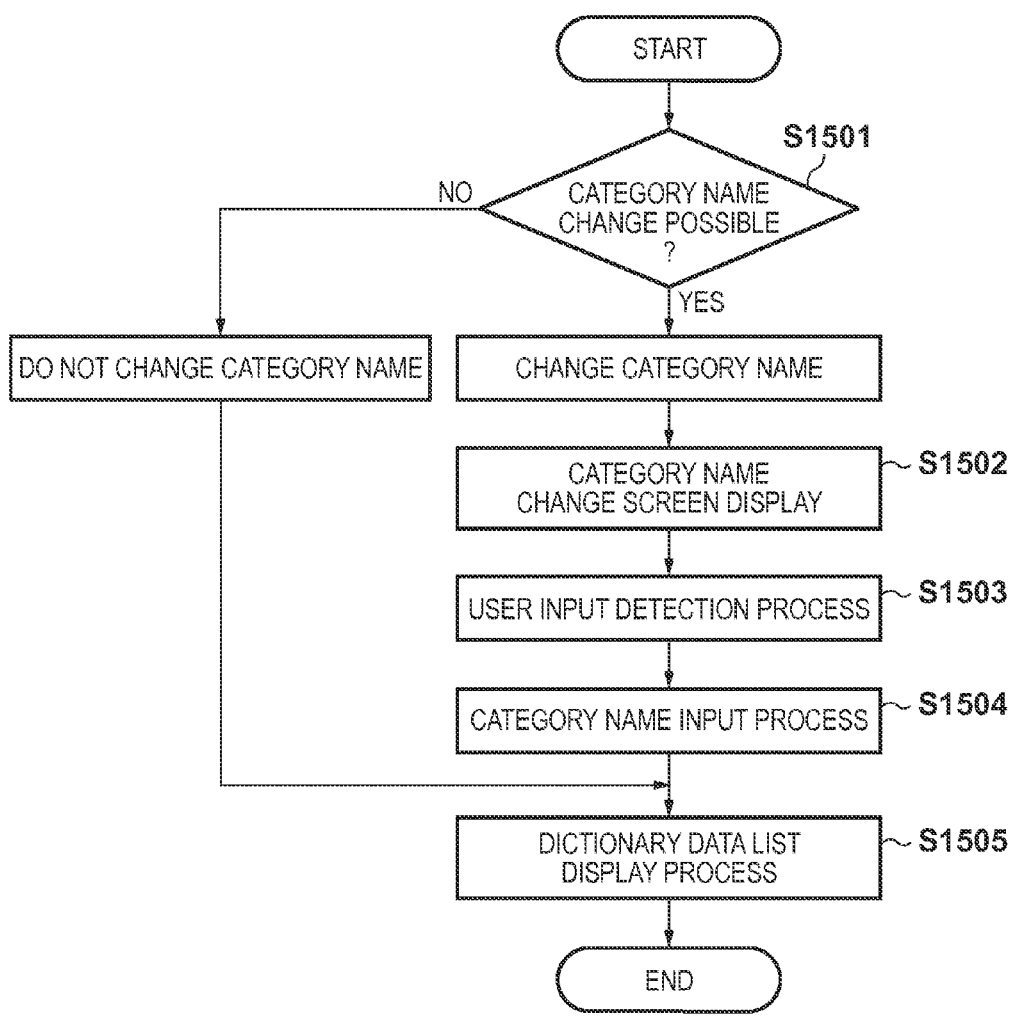
FIG. 11 is a flowchart illustrating a category modification process.

Here, the descriptions will once again return to the flowchart illustrated in FIG. 2. Next, step S205, in which the process for changing categories is carried out, will be described. FIG. 11 is a processing flowchart illustrating details of a category change processing step. FIG. 11 illustrates a processing flow carried out when executing a category change.

In step S1501, the category changing unit 105 determines whether or not to change a category name. To be more specific, the category changing unit 105 determines whether or not to change the category name based on the user input made in step S904 or step S906 in the aforementioned flowchart of FIG. 7. In step S904 or step S906, the display unit 104 outputs a message as indicated in the aforementioned FIG. 8A or FIG. 8B, and the operation unit 107 receives an input from the user. The user input made in step S904 or step S906 is a response to a message reading "Merge category names?", and this response is either "Yes" or "No".

In the case where the user inputs "Yes" in step S1501, the procedure advances to step S1502. However, in the case where the user inputs "No", the procedure advances to step S1505. Next, a process carried out in the case where it has been determined in step S1501 to change the category name will be described.

Figure 12:
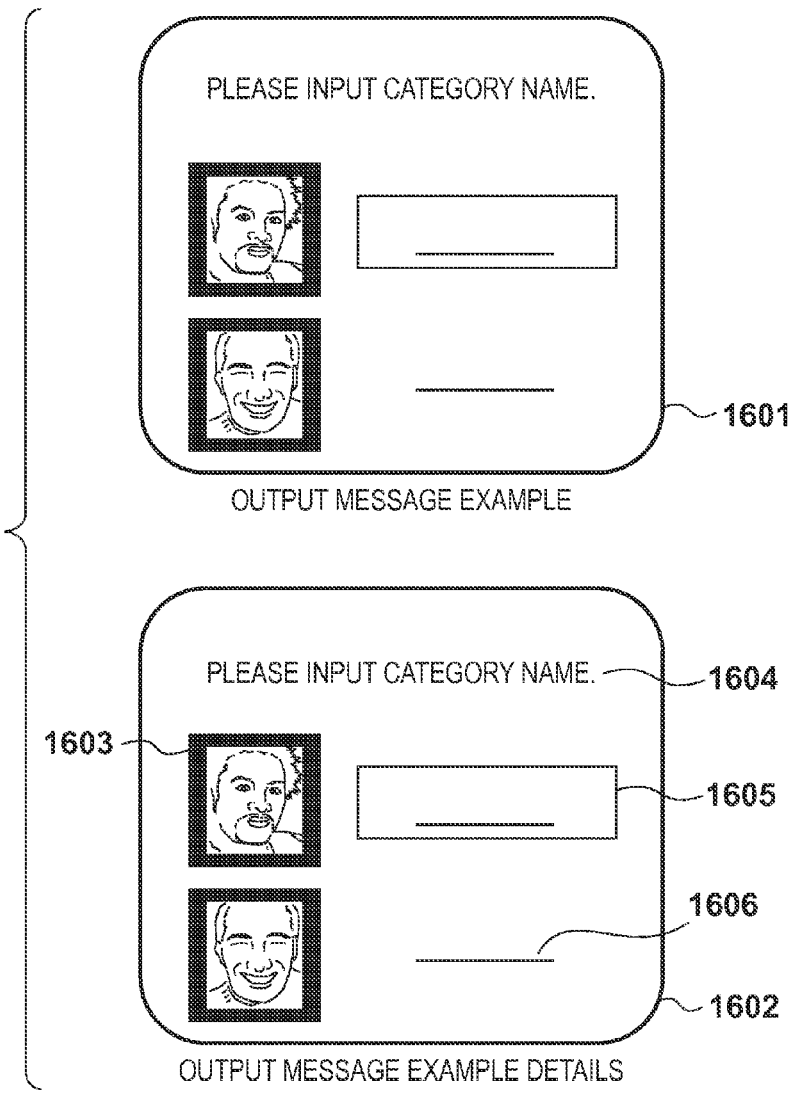
FIG. 12 is a diagram illustrating an output on a liquid crystal monitor used for user input.
Figure 13:
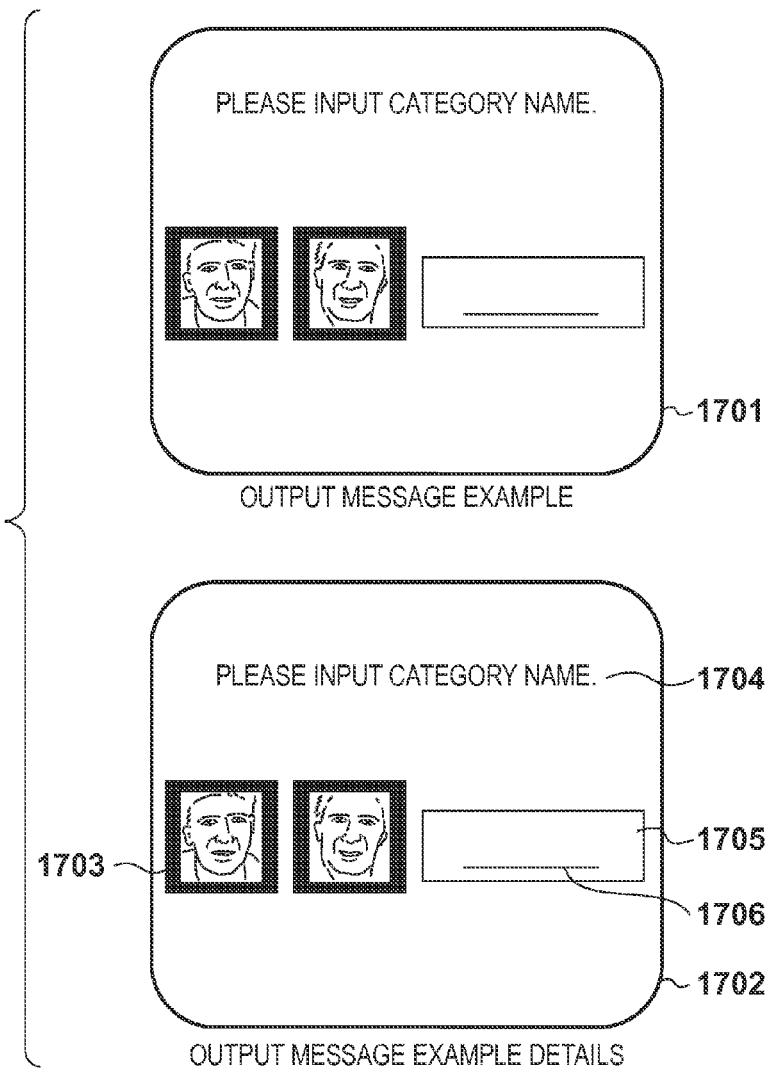
FIG. 13 is a diagram illustrating an output on a liquid crystal monitor used for user input.

FIG. 12 and FIG. 13 are examples of category name changing screen displays. First, the differences between FIG. 12 and FIG. 13 will be described. FIG. 12 indicates a category name changing screen for a case in which two dictionary images are of different people. Meanwhile, FIG. 13 indicates a category name changing screen for a case in which two dictionary images are of the same person. Here, before the screens shown in FIG. 12 and FIG. 13 are displayed, the category changing unit 105 compares the category names of the two dictionary images displayed in the screen in order to determine whether or not those category names match. In the case where the dictionary images are of the same person, different category names are assigned to the respective images prior to the category name change, but because the images are of the same person, the category names are changed so as to match. The result is that only one category is present. Next, descriptions will be given of the respective elements of the output message, and because the details of the elements in FIG. 13 are the same as those in FIG. 12, detailed descriptions of the elements in FIG. 13 will be omitted. Please note that a new category name need not always be input and set when matching the category names. For example, a category name selected from among a plurality of category names to be matched may be set.

An output message example 1601 is a message that is output to the liquid crystal monitor 306 in step S1502. An output message example 1602 indicates the detailed configuration of the output message example 1601. The output message includes dictionary images 1603, a message 1604, a cursor 1605, and input fields 1606. The dictionary images 1603 are images used for changing the category name. The message 1604, meanwhile, is used to output an instruction to the user, after which the apparatus stands by for an input regarding a category name change. The cursor 1605 is used when selecting the image for which the category is to be changed. The input fields 1606 display the category names before and after input.

Here, the descriptions will return to the flowchart illustrated in FIG. 11. When the processing in step S1502 ends, the procedures moves to step S1503. In step S1503, the operation unit 107 detects a user input made in response to the message displayed in step S1502. "User input" refers specifically to selecting the input fields 1606 or 1706 using the cursor 1605 or 1705 illustrated in FIG. 12 or FIG. 13. The selection operations performed by the user are set using a set button 1203 illustrated in the aforementioned FIG. 9.

Figure 14:
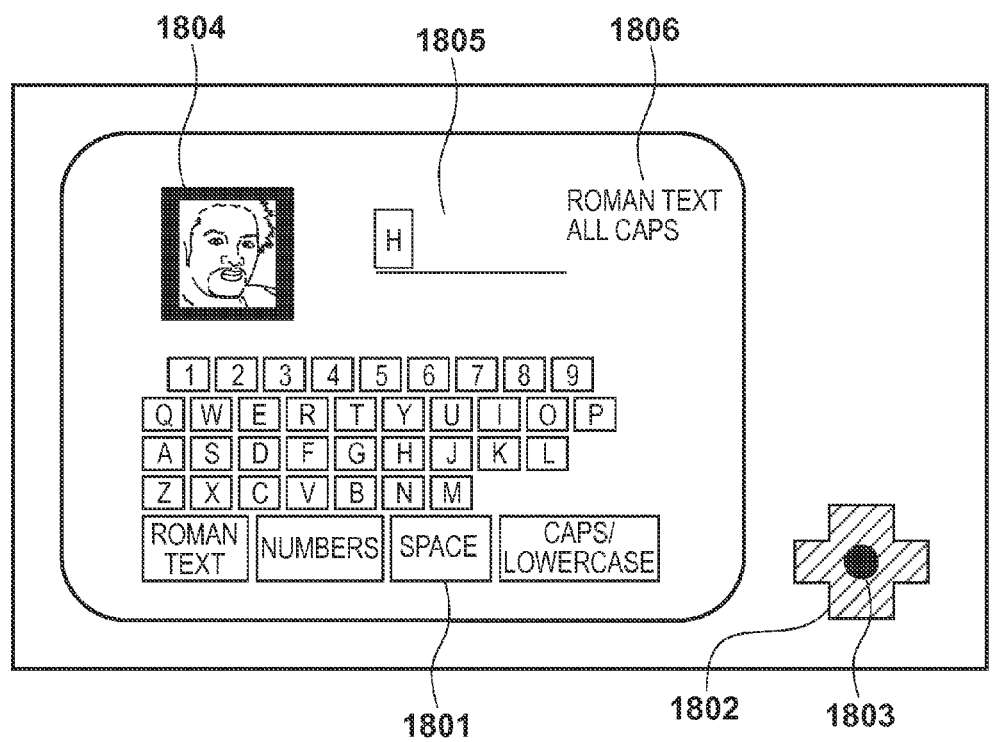
FIG. 14 is a diagram illustrating an output on a liquid crystal monitor used for user input.

Next, in step S1504, the category changing unit 105 carries out a process for inputting category names. In other words, content is actually written into the input field selected by the user in the previous step. FIG. 14 illustrates a screen that is output in the liquid crystal monitor 306 in step S1504. When the process moves to step S1504, a category input console area 1801, a dictionary image 1804, an input field 1805, and an input setting display area 1806 are output to the liquid crystal monitor 306.

A keyboard displayed in the screen can be given as an example of the category input console area 1801. The input is carried out by selecting a key in which "Roman text", "numbers", or the like is written using a cursor key 1802, and setting the characters using a set button 1803. At this time, the input setting display area 1806, which indicates whether Roman text will be input or capital letters will be input, is located in the upper-right area of the screen. Meanwhile, in this case, the "H" key is whited out, which indicates that "H" is selected.

Meanwhile, the dictionary image 1804 indicates the dictionary image for which the category is being input. Furthermore, the input field 1805 displays the category that is being input. In step S1504, the user inputs a category name using the category input console shown in FIG. 14. However, it should be noted that the method for inputting the category name is not limited to a method that uses the aforementioned console. For example, a touch panel scheme in which text can be input by touching a console area of the liquid crystal monitor 306 may be employed as well.

Figure 15:
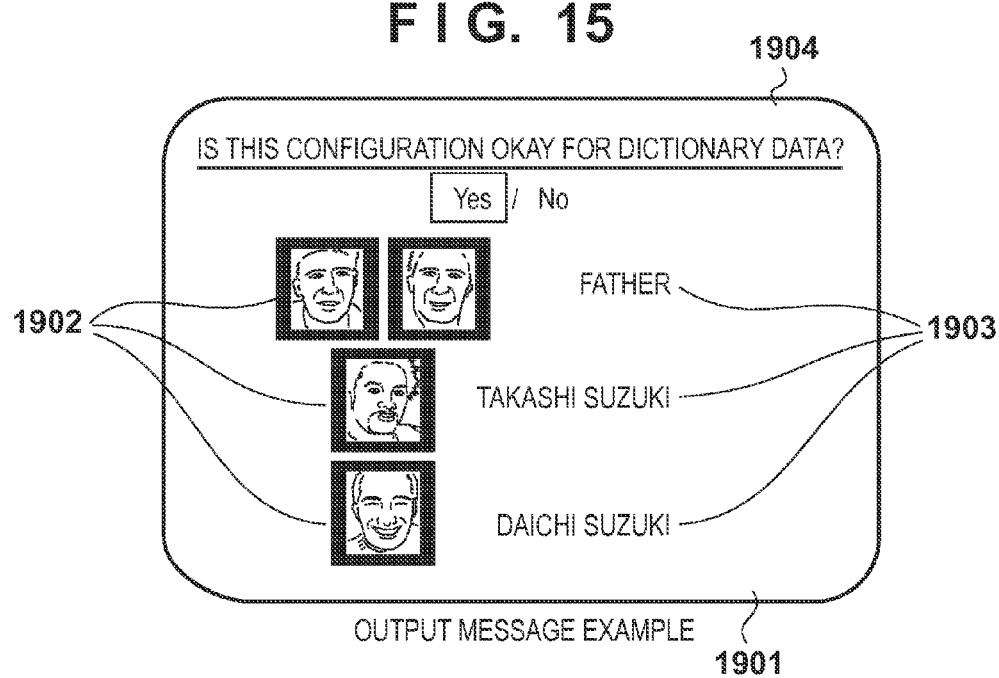
FIG. 15 is a diagram illustrating an output on a liquid crystal monitor used for user confirmation.

The descriptions will now return to the flowchart in FIG. 11. When the processing of step S1504 ends, the procedure moves to step S1505, where a list of the next dictionary data is displayed. In step S1505, the display unit 104 displays the current dictionary images along with their respective category names regardless of whether the category names have been changed or not, and the operation unit 107 stands by for the user to make an input for confirmation. FIG. 15 illustrates a display, used for confirmation, that is output to the liquid crystal monitor 306.

In step S1504, an output message example 1901 is displayed. The output message example 1901 includes dictionary images 1902, category names 1903 for the corresponding dictionary images, and a message 1904. The user checks the output message, and then confirms whether the category names corresponding to the dictionary images match the intent of that user. When the configuration of the dictionary data matches the intent of the user, the user selects "Yes" in the message 1904 by operating the cursor key or the like, and then presses the set button. On the other hand, when the configuration of the dictionary data does not match the intent of the user, the user selects "No" in the message 1904, and presses the set button. In the case where "No" has been selected, the process once again returns to step S1501, where the category names are created. However, in the case where "Yes" has been selected, the flowchart shown in FIG. 11 ends.

The preceding have been descriptions of the first embodiment, but the dictionary data according to the first embodiment is not intended to be limited to facial information, and the present invention can also be applied in the case where the dictionary data is another common object. To be more specific, the dictionary data may indicate pets, flowers, or the like. In such a case, the dictionary data includes feature amounts for distinguishing between types of pets, flowers, or the like. Furthermore, in the preceding descriptions, the integration of the category names was described as taking place between two different dictionaries. However, it goes without saying that in the case where in a single dictionary, the same person is included in categories having different names due to differences in the creator, the creation date, or the like, those category names can also be integrated.

As described us far, according to the first embodiment, when integrating dictionary data among multiple devices, it is possible to set category names for the same person in the dictionary data among the multiple devices without causing conflicts. Furthermore, it is also possible to set category names for dictionary data among the multiple devices, in which the people are not the same but the category name is the same, without conflict. Finally, the category names can be easily reconstructed through the use of a simple interface.

Second Embodiment

In the second embodiment, a technique for integrating dictionary data in which multiple images of multiple registrants are present with dictionary data that is unique to a device will be described.

Figure 16:
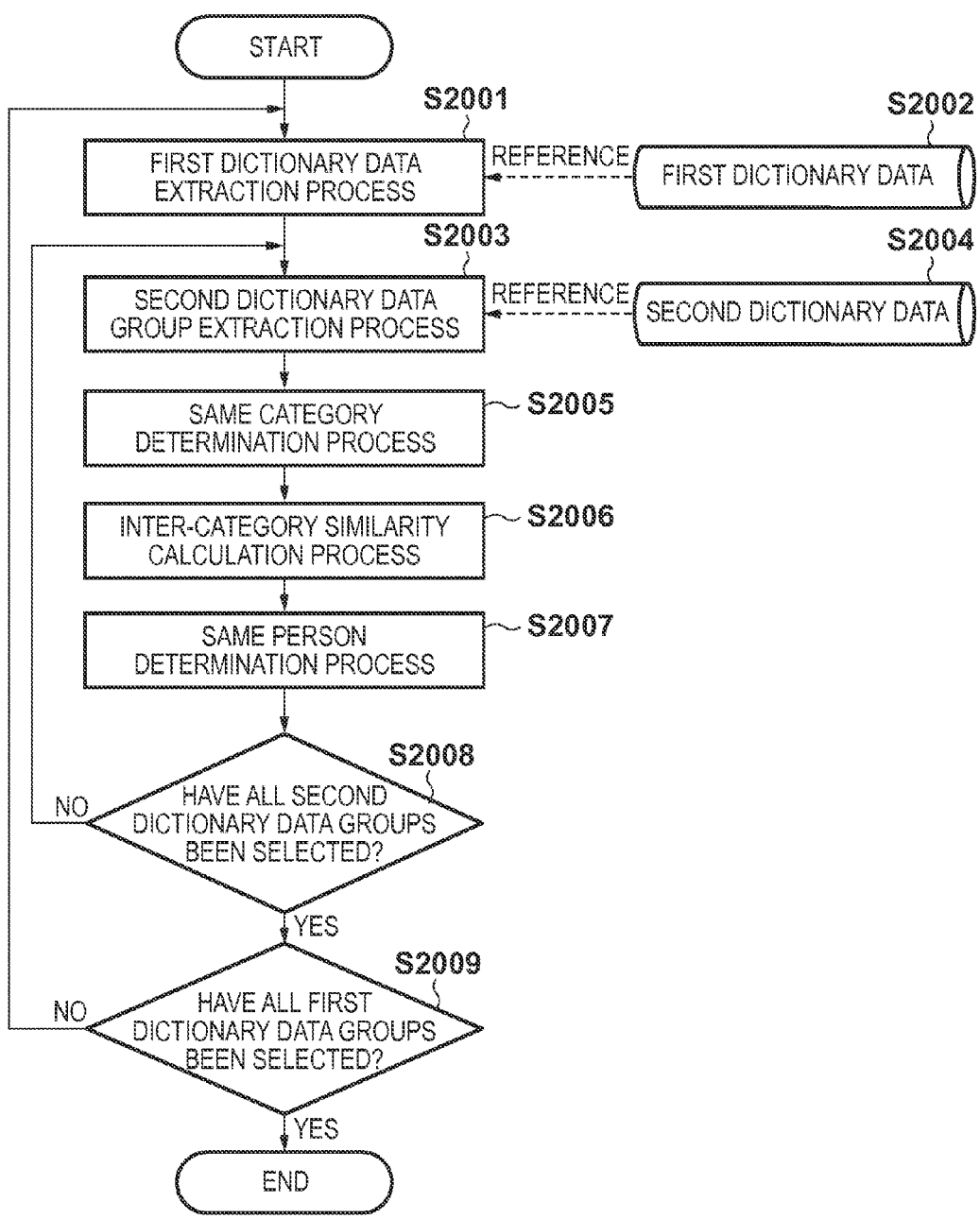
FIG. 16 is a flowchart illustrating a procedure for determining the same person among multiple people.

FIG. 16 is a flowchart according to the second embodiment, corresponding to the flowchart of step S202 shown in the aforementioned FIG. 2, in which a matching process is carried out.

Figure 17:
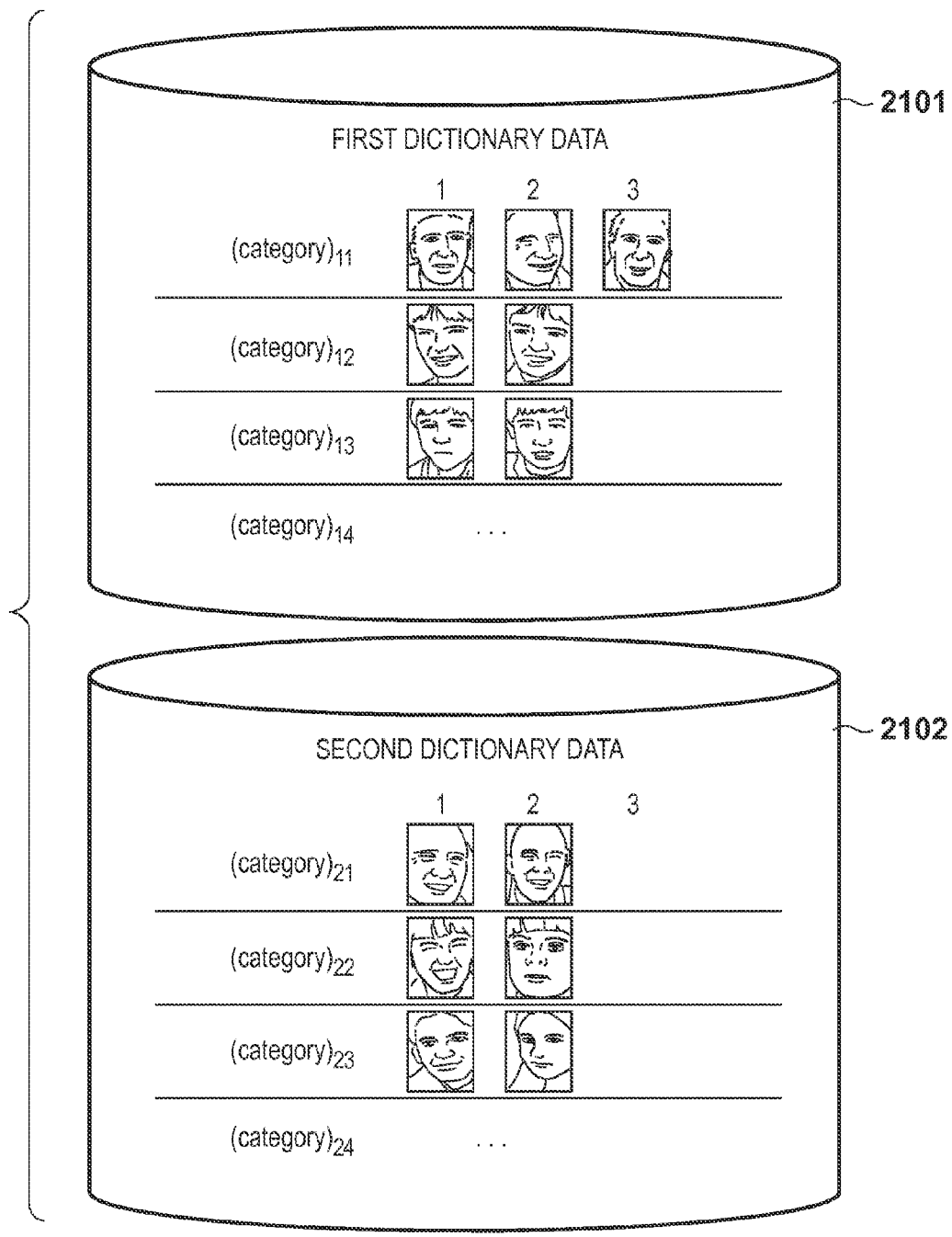
FIG. 17 is a diagram illustrating the category configuration of respective pieces of dictionary data.

In step S2001, the dictionary data comparison unit 103 extracts a dictionary image group belonging to a certain category from first dictionary data 2002. The "first dictionary data 2002" refers to first dictionary data 2101 shown in FIG. 17. In S2001, specifically, a process for obtaining a dictionary image group of a (category)$_{11}$ in the first dictionary data 2101 shown in FIG. 17 is carried out. Here, (category)$_{11}$ indicates the category name of the dictionary image group, and has a category name of, for example, "father".

Next, in step S2003, the dictionary data comparison unit 103 extracts a dictionary image group belonging to a certain category from second dictionary data 2004. The "second dictionary data 2004" refers to second dictionary data 2102 shown in FIG. 17. Like the aforementioned first dictionary data, the second dictionary data includes a category name and dictionary images.

Figure 20:
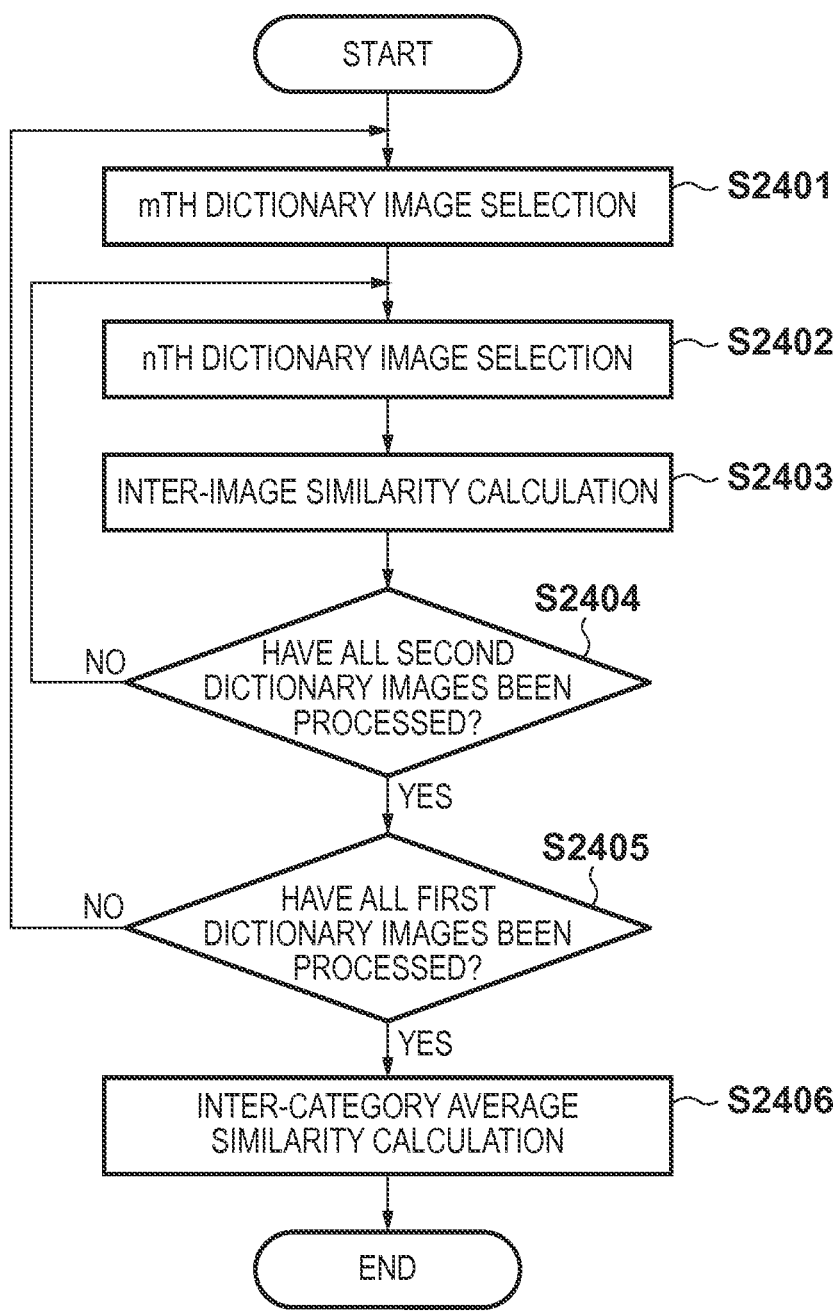
FIG. 20 is a flowchart illustrating a method for calculating an average similarity between categories.

In step S2006, the dictionary data comparison unit 103 calculates a similarity between the dictionary image groups extracted in S2001 and S2003. Details of the method for calculating the similarity between categories will be described using the flowchart shown in FIG. 20.

Here, it is assumed that the number of images belonging to a category in the first dictionary data is m, whereas the number of images belonging to a category in the second dictionary data is n. First, in S2401, the dictionary data comparison unit 103 selects the mth dictionary image from among the m dictionary images. Next, in S2402, the dictionary data comparison unit 103 selects the nth dictionary image. Furthermore, in step S2403, the dictionary data comparison unit 103 calculates a similarity between the selected images. Here, the similarity is calculated using the normalized correlation value expressed through Formula (1). Next, in step S2404, the dictionary data comparison unit 103 determines whether or not all of the images in the second dictionary data have been processed. When it has been determined in step S2404 that all the images have been processed, the procedure moves to step S2405. However, in the case where unprocessed images remain in the second dictionary data, the procedure returns to step S2402, which is a process for selecting dictionary images. Next, in step S2405, the dictionary data comparison unit 103 determines whether or not all of the images in the first dictionary data have been processed, in the same manner as the processing carried out in step S2404.

In step S2406, the dictionary data comparison unit 103 carries out the calculation indicated by the following formula, in order to calculate an average similarity (correlation value) between the categories.

$$\text{average similarity} = \frac{1}{n \times m} \sum \left\{ \frac{(I_{1m} \cdot I_{2n})}{|I_{1m}||I_{2n}|} \right\} \quad (2)$$

Formula (2) expresses an inter-category average correlation value. Here, a first luminance vector $I_{1m}$ is a luminance vector for the mth dictionary image in the first dictionary data. Meanwhile, a second luminance vector $I_{2n}$ is a luminance vector for the nth dictionary image in the second dictionary data. The preceding describes a process for calculating the similarity between categories.

Returning to the descriptions in FIG. 16, next, step S2007, in which a process for determining whether people are the same person is carried out, will be described. In this step, a determination as to whether a person in the dictionary data selected in step S2001 and a person in the dictionary data selected in step S2003 are the same person is carried out based on the similarity between categories calculated using Formula (2). The determination as to whether or not the people are the same person is carried out through a process that applies a predetermined threshold to the similarity between the categories.

Next, the dictionary data comparison unit 103 determines, in step S2008, whether or not all of the categories in the second dictionary data group have been selected, and determines, in step S2009, whether or not all of the categories in the first dictionary data group have been selected. In the case where it has been determined that all the categories have been selected, the steps in the flowchart shown in FIG. 16 end.

Next, processes according to the second embodiment regarding steps S204 and S205 shown in FIG. 2, in which the interactive process and the category change process are carried out respectively, will be described.

The interactive process and the category change process according to the second embodiment are basically the same as the processes described in the first embodiment. However, while only a single dictionary image is present for each of the categories in the first dictionary data and the second dictionary data in the first embodiment, there are multiple such images present in the second embodiment. As a result of this difference, the process for making an output to the user is different from the first embodiment. Accordingly, a representative example will be described hereinafter in order to illustrate this difference.

Figure 18:
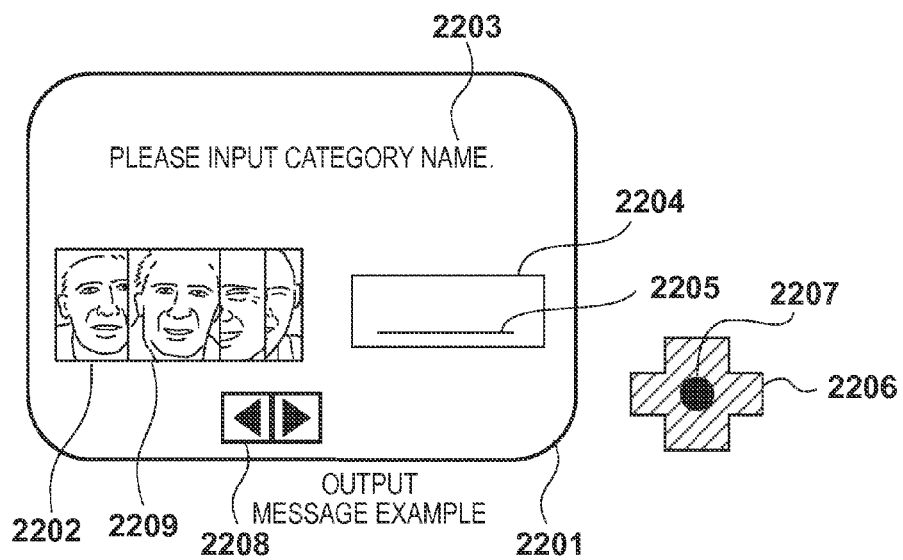
FIG. 18 is a diagram illustrating an output on a liquid crystal monitor used for user input.

FIG. 18 illustrates a screen for receiving a user input according to the second embodiment, and illustrates a screen that is similar to that shown in FIG. 13 and described in the first embodiment. An output message example 2201 in FIG. 18 includes a dictionary image group 2202, a message 2203, a cursor 2204, an input field 2205, a cursor key 2206, an image switcher 2208, and a pop-up image 2209. Here, the difference between the content shown in FIG. 13 and described in the first embodiment is in the method for displaying the dictionary images. As shown in FIG. 18, five dictionary images are present as a result of integrating the dictionary data. Accordingly, when changing the category name, the monitor will be filled with dictionary images if the same display method as that described in the first embodiment is used, and the area in which the input field and the like is displayed will be limited as a result. Therefore, using the same display as that described in the first embodiment does not give consideration to the user.

Accordingly, as shown in FIG. 18, the dictionary images are displayed with some of those images overlapping other images. At this time, in the case where the user wishes to check a single image in detail, that desired dictionary image is displayed as a pop-up using the image switcher 2208. The pop-up image 2209 shown in FIG. 18 is an example of such a pop-up image. Furthermore, for example, the cursor key 2206 may be used to move the cursor 2204 to the image switcher 2208, whereupon the pop-up image may be changed by pressing the left and right buttons of the cursor key 2206, in order to display pop-up image after pop-up image.

It should be noted, however, that the method for changing the pop-up image is not limited to this method. As an example of another method, if a touch panel-equipped monitor is provided, an image that has been touched may be displayed as a pop-up.

Figure 19:
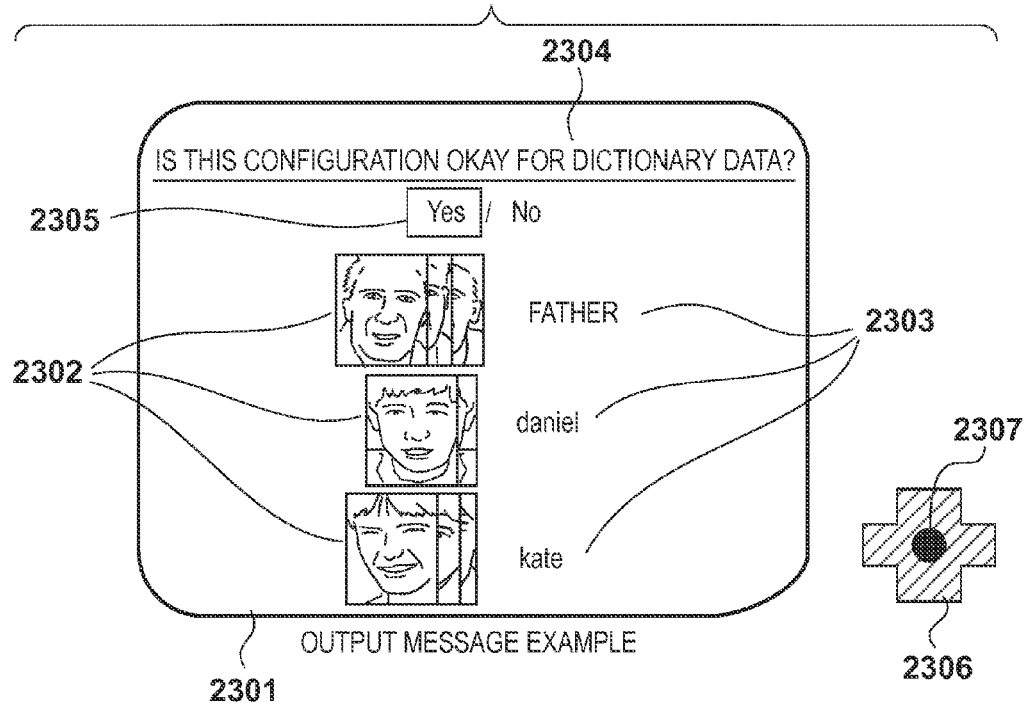
FIG. 19 is a diagram illustrating an output on a liquid crystal monitor used for user confirmation.

FIG. 19 is a diagram illustrating a configuration for making confirmations according to the second embodiment, and corresponds to FIG. 15 described in the first embodiment. An output message 2301 illustrated in FIG. 19 includes dictionary image groups 2302, category names 2303, a message 2304, a cursor 2305, a cursor key 2306, and a set button 2307. Descriptions of elements that are the same as in the aforementioned FIG. 15 will be omitted here.

First, multiple dictionary images are present, and therefore some of the dictionary images in the respective categories are displayed in an overlapping state. As with FIG. 18 mentioned above, when the cursor 2305 is aligned with a category name 2303 and the set button 2307 is pressed, the pop-up image can be switched by then pressing the left and right buttons of the cursor key.

As described as far, according to the second embodiment, the category names can be reconstructed as appropriate, even in the case where categories including multiple dictionary images are present in the dictionary data that is to be integrated. Furthermore, by presenting the user with an interface that is easy to handle at this time, it is possible to reduce the burden of operations on the user.

Third Embodiment

A third embodiment will describe a technique for adjusting the number of dictionary images in respective categories after the integration of dictionary data, in order to reduce the amount of dictionary images that are stored. Specifically, a case will be considered in which three dictionary images belong to a certain category in first dictionary data, and two dictionary images belong to a certain category in second dictionary data. Here, it is assumed that the dictionary data is integrated with the respective dictionary images including the same person.

Generally, in this situation, five dictionary images will belong to the category after the dictionary data has been integrated; however, there are also situations where the digital camera has an insufficient memory size, in which case it is not desirable to actually record all five images. Accordingly, it is necessary to select a preferred image to use as the dictionary image from those five images and reduce the number of images to a number permitted by the memory size. The following will describe a method for reducing the number of dictionary images.

Figure 21:
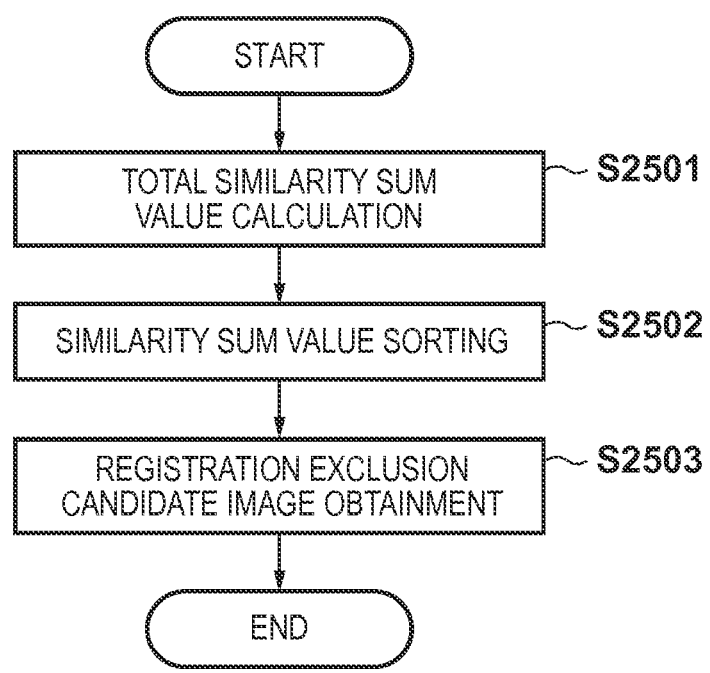
FIG. 21 is a flowchart illustrating a procedure for obtaining a registration exclusion candidate image.

FIG. 21 is a flowchart illustrating details of the third embodiment. In step S2501, the dictionary data comparison unit 103 executes a process for calculating a sum of the similarities between the dictionary image group in the certain category of the first dictionary data and the dictionary image group in the certain category of the second dictionary data that are to be integrated. In this case, the sum of the similarities between ith dictionary images is found using the following formula.

$$S_i = \sum_{i \neq j} \left\{ \frac{(I_i \cdot I_j)}{|I_i||I_j|} \right\} \begin{bmatrix} i = 1, 2 \ldots n \times m \\ j = 1, 2 \ldots n \times m \end{bmatrix} \quad (3)$$

Here, $I_i$ and $I_j$ are luminance vectors of first and second dictionary images, respectively. Meanwhile, n and m indicate what number dictionary image a dictionary image is in the dictionary data.

Next, in step S2502, the dictionary data comparison unit 103 sorts the sums of the similarities between the respective dictionary images found through Formula (3). The values of the sums of the similarities are arranged in descending order as a result of this sorting. Furthermore, in step S2503, the dictionary data comparison unit 103 specifies candidates for images to be deleted after the integration of the dictionary data, based on the results of the sorting carried out in the previous step.

In other words, according to the present embodiment, in the case of m dictionary image groups in a first category in the first dictionary data and n dictionary image groups in a second category in the second dictionary data, when the sum of m and n is greater than a predetermined number N, the sums of the similarities between each image in the other dictionary images are calculated; The dictionary images are then arranged in order starting with the dictionary image having the sum of similarities that is the lowest, and the dictionary images from the N+1th image on are deleted from the first category and the second category. In this example, the two dictionary images with the highest similarity sums are selected as registration exclusion images. In other words, the two dictionary images with the highest similarity sums are very similar to the other dictionary images. There will thus be little effect on the accuracy of the facial recognition even if the highest two dictionary images are deleted. Accordingly, the two dictionary images with the highest similarity sums are deleted from the post-integration dictionary images. Note that the information used to exclude the dictionary images is not limited to the similarities between the dictionary images, and other parameters may be employed as well. As an example, the date/time at which each dictionary image was recorded, the image quality of the dictionary images, or fluctuating conditions of the dictionary images may be used as well. For example, in the case where the day on which the image was recorded is used, dictionary images whose recording dates/times are older may be excluded. In the case where the image quality of the dictionary images is used, blurry images and the like may be excluded. Furthermore, in the case where fluctuating conditions of the dictionary images are used, the dictionary images to be excluded can be determined based on, for example, the orientation of the face in the image.

As described thus far, according to the third embodiment, it is possible to integrate the dictionary data while suppressing the amount of memory required by the dictionary data, and it is also possible to prevent a drop in the facial recognition accuracy resulting from the post-integration dictionary data.

Fourth Embodiment

A fourth embodiment will describe a technique in which the dictionary data integration is carried out by a personal computer (referred to as a "PC" hereinafter) and a digital camera. The present embodiment assumes a configuration in which the PC is connected to the digital camera. Using this configuration, dictionary data that is held by a facial recognition application in the PC is integrated with dictionary data held by the digital camera. The integration operations carried out at this time are as follows.

First, in response to a user instruction, the dictionary data is downloaded from the PC into the Compact Flash memory of the digital camera. Note that the operations of the digital camera, which is the destination of the integration, are the same as the operations described in the first embodiment. However, the integration destination is not limited to the digital camera, and may be the same PC that serves as the integration source. In the fourth embodiment, images that the user considers appropriate are selected from image resources on the PC; the user then adds category names to those images, and copies the images into the Compact Flash memory as dictionary data.

With the configuration according to the fourth embodiment, the user selects images optimal for facial recognition from the PC, and integrates those images into the dictionary data of the digital camera, achieving an effect in which the dictionary data can be easily constructed without carrying out registration operations through the digital camera.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-188752, filed Aug. 25, 2010, which is hereby incorporated by reference herein in its entirety.

What is claimed is:

1. An object recognition apparatus comprising at least one processor functioning as:
    an extraction unit configured to extract first dictionary information associated with a first category from among multiple categories included in a dictionary for object recognition and second dictionary information associated with a second category from among multiple categories included in the dictionary or another dictionary;
    a determination unit configured to calculate a first feature amount and a second feature amount from the first dictionary information and the second dictionary information, respectively, and determine whether or not a similarity between the calculated first feature amount and second feature amount is greater than a predetermined threshold;
    a comparison unit configured to compare a name of the first category with a name of the second category;
    a reception unit configured to receive an instruction as to whether or not to integrate the name of the first category and the name of the second category in the case where the determination unit has determined that the similarity is greater than the predetermined threshold and the comparison unit has determined that the name of the first category and the name of the second category do not match; and
    an integration unit configured, in the case where the reception unit has received an instruction to integrate the names of the categories and a post-integration name, to integrate the name of the first category and the name of the second category with the received post-integration name.

2. The object recognition apparatus according to claim 1, wherein the reception unit receives an input of the names of the first category and the second category, respectively, in the case where the determination unit has determined that the similarity is not greater than the predetermined threshold and the comparison unit has determined that the names of the first category and the second category match.

3. The object recognition apparatus according to claim 1, wherein the first feature amount is a first luminance vector calculated from the facial region of an image of a person included in the first dictionary information, the second feature amount is a second luminance vector calculated from the facial region of an image of a person included in the second dictionary information, and the determination unit determines whether or not a correlation value between the first luminance vector and the second luminance vector is greater than the predetermined threshold.

4. The object recognition apparatus according to claim 3, wherein in the case where the extraction unit has extracted a first luminance vector $I_{1m}$ calculated from images of people included in the first dictionary information of the first category and a second luminance vector $I_{2n}$ calculated from n images of people included in the second dictionary information of the second category, the determination unit uses the following formula to calculate an average similarity between the first category and the second category and determines that the first dictionary information included in the first category and the second dictionary information included in the second category are the same in the case where the calculated average similarity is greater than the predetermined threshold.

$$\text{average similarity} = \frac{1}{n \times m} \sum \left\{ \frac{(I_{1m} \cdot I_{2n})}{|I_{1m}||I_{2n}|} \right\}$$

5. The object recognition apparatus according to claim 4, wherein in the case where the determination unit has determined that the first dictionary information included in the first category and the second dictionary information included in the second category are the same and the sum of m and n is greater than a predetermined number N, the integration unit uses the following formula, which finds the sum of similarities of the ith dictionary information, to arrange the dictionary information in ascending order of sum of similarities as calculated for each of the m pieces of first dictionary information and the n pieces of second dictionary information, and deletes the N+1th and following dictionary information from the first category or the second category.

$$(\text{similarity sum})_i = \sum_{i \neq j} \left\{ \frac{(I_i \cdot I_j)}{|I_i||I_j|} \right\} \begin{bmatrix} i = 1, 2 \dots n \times m \\ j = 1, 2 \dots n \times m \end{bmatrix}$$

6. An object recognition method for an object recognition apparatus, the method comprising:
    extracting first dictionary information associated with a first category from among multiple categories included in a dictionary for object recognition and second dictionary information associated with a second category from among multiple categories included in the dictionary or another dictionary;
    calculating a first feature amount and a second feature amount from the first dictionary information and the second dictionary information, respectively, and determining whether or not a similarity between the calculated first feature amount and second feature amount is greater than a predetermined threshold;

comparing a name of the first category with a name of the second category;

receiving an instruction as to whether or not to integrate the name of the first category and the name of the second category in the case where it has been determined that the similarity is greater than the predetermined threshold and that the name of the first category and the name of the second category do not match; and integrating, in the case where an instruction to integrate the names of the categories and a post-integration name have been received, the name of the first category and the name of the second category with the received post-integration name.

7. A non-transitory computer-readable storage medium in which is stored a program for causing a computer to function as:

an extraction unit configured to extract first dictionary information associated with a first category from among multiple categories included in a dictionary for object recognition and second dictionary information associated with a second category from among multiple categories included in the dictionary or another dictionary;

a determination unit configured to calculate a first feature amount and a second feature amount from the first dictionary information and the second dictionary information, respectively, and determine whether or not a similarity between the calculated first feature amount and second feature amount is greater than a predetermined threshold;

a comparison unit configured to compare a name of the first category with a name of the second category;

a reception unit configured to receive an instruction as to whether or not to integrate the name of the first category and the name of the second category in the case where the determination unit has determined that the similarity is greater than the predetermined threshold and the comparison unit has determined that the name of the first category and the name of the second category do not match; and an integration unit configured, in the case where the reception unit has received an instruction to integrate the names of the categories and a post-integration name, to integrate the name of the first category and the name of the second category with the received post-integration name.

* * * * *